United States Patent
Iwasa et al.

(10) Patent No.: US 8,860,997 B2
(45) Date of Patent: Oct. 14, 2014

(54) IMAGE OUTPUT APPARATUS, PREVIEW IMAGE GENERATING METHOD, AND STORAGE MEDIUM

(71) Applicants: Keisuke Iwasa, Yokohama (JP); Hajime Kubota, Sagamihara (JP); Hideaki Matsui, Kawasaki (JP); Daisuke Okada, Kawasaki (JP); Yuto Shibata, Zama (JP)

(72) Inventors: Keisuke Iwasa, Yokohama (JP); Hajime Kubota, Sagamihara (JP); Hideaki Matsui, Kawasaki (JP); Daisuke Okada, Kawasaki (JP); Yuto Shibata, Zama (JP)

(73) Assignee: Ricoh Company, Ltd., Tokyo (JP)

( * ) Notice: Subject to any disclaimer, the term of this patent is extended or adjusted under 35 U.S.C. 154(b) by 199 days.

(21) Appl. No.: 13/648,021

(22) Filed: Oct. 9, 2012

(65) Prior Publication Data
US 2013/0088737 A1    Apr. 11, 2013

(30) Foreign Application Priority Data
Oct. 11, 2011    (JP) .................................. 2011-223567

(51) Int. Cl.
G06F 3/12    (2006.01)
H04N 1/00    (2006.01)

(52) U.S. Cl.
CPC ...... *H04N 1/0044* (2013.01); *H04N 2201/0082* (2013.01); *H04N 1/00941* (2013.01)
USPC ......... 358/1.15; 358/1.9; 358/1.13; 358/1.14; 715/274

(58) Field of Classification Search
CPC ... G06F 3/1256; G06F 3/1205; G06F 3/1208; G06F 3/1211; G06F 3/1255; G06F 3/1207; G06F 3/1206

USPC ........ 358/1.15, 1.14, 1.13, 1.9; 715/274, 273, 715/747
See application file for complete search history.

(56) References Cited

U.S. PATENT DOCUMENTS

| | | | |
|---|---|---|---|
| 7,633,659 B2* | 12/2009 | Uotani et al. | 358/527 |
| 8,074,180 B2* | 12/2011 | Yamada | 715/781 |
| 8,681,367 B2* | 3/2014 | Nakagiri et al. | 358/1.15 |
| 2003/0103221 A1* | 6/2003 | Natori | 358/1.9 |
| 2009/0070814 A1* | 3/2009 | Kim et al. | 725/40 |
| 2009/0204895 A1* | 8/2009 | Bhatt et al. | 715/273 |
| 2009/0265625 A1* | 10/2009 | Tamai et al. | 715/274 |
| 2010/0293458 A1* | 11/2010 | Rolleston et al. | 715/274 |
| 2010/0306646 A1* | 12/2010 | Fukase | 715/274 |
| 2012/0314228 A1* | 12/2012 | Kobayashi | 358/1.2 |
| 2014/0009787 A1* | 1/2014 | Shiohara | 358/1.15 |

FOREIGN PATENT DOCUMENTS

| | | |
|---|---|---|
| JP | 2006-127478 | 5/2006 |
| JP | 2010-20545 | 1/2010 |

* cited by examiner

*Primary Examiner* — Dennis Dicker
(74) *Attorney, Agent, or Firm* — Oblon, Spivak, McClelland, Maier & Neustadt, L.L.P.

(57) ABSTRACT

A preview image of image data to be output is generated, in response to a request from an operation device, and can be displayed via the operation device. A first preview image of the image data is generated based on an output setting for outputting the image data. The first preview image is stored in a storage device. The output setting can be changed based on a changing request from the operation device. It is determined, in response to a second preview request from the operation device, after sending the first preview image, whether the first preview image is to be regenerated, based on the changed output setting. The first preview image stored in the storage device can be sent when the first preview image is not to be regenerated, for example, when a second preview image is not to be generated.

16 Claims, 5 Drawing Sheets

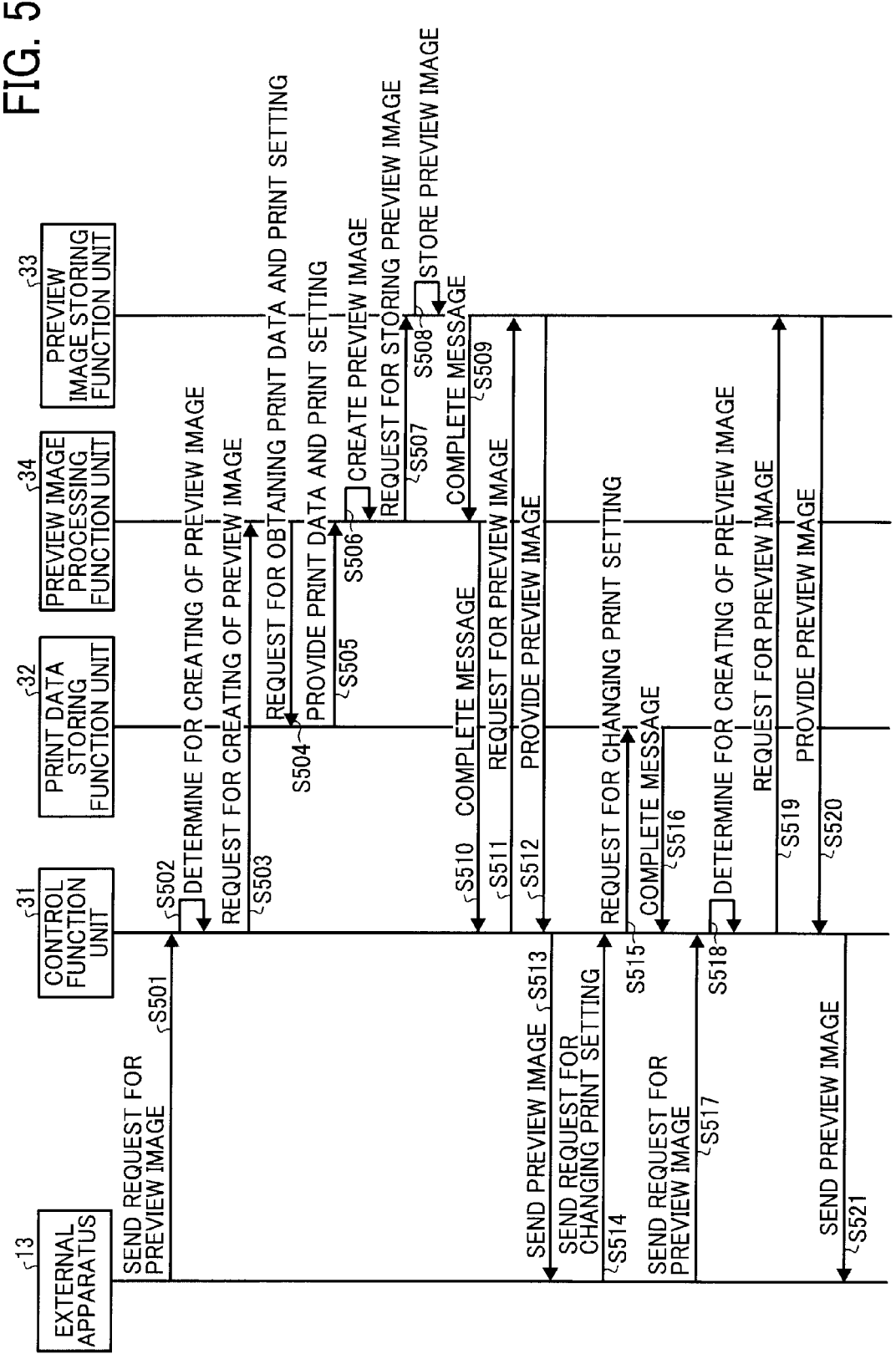

IMAGE OUTPUT APPARATUS, PREVIEW IMAGE GENERATING METHOD, AND STORAGE MEDIUM

CROSS-REFERENCE TO RELATED APPLICATIONS

The present application claims priority under 35 U.S.C. §119(a) to and incorporates by reference the entire contents of Japanese Patent Application No. 2011-223567 filed in Japan on Oct. 11, 2011.

BACKGROUND

Japanese Patent Application Laid-open No. 2010-020545 describes an image forming apparatus which includes a preview function before printing image data.

In this image forming apparatus, before printing the image data, the apparatus generates a preview image of the image data based on a print setting, and displays the generated preview image on a display device in the image forming apparatus.

Furthermore, when the print setting is changed by a user, this image forming apparatus regenerates the preview image based on the changed print setting and displays the regenerated preview image on the display device.

SUMMARY

Aspects of this disclosure can relate to image forming and image or print preview generating apparatuses, devices, processes, algorithms and systems.

An image output apparatus can include a preview image generating unit configured to generate a first preview image of image data to be output based on an output setting for outputting the image data, a preview image storing unit configured to store the first preview image in a storage device, a changing unit configured to change the output setting based on a changing request from an operation device, and a control unit configured to send, in response to a first preview request from the operation device, the first preview image to the operation device. The control unit can be configured to determine, in response to a second preview request from the operation device after sending the first preview image, whether the first preview image is to be regenerated, and can be configured to send the first preview image stored in the storage device to the external apparatus when the control unit determines the first preview image is not to be regenerated.

A preview image generating method on an image output apparatus can include generating a first preview image of image data to be output based on an output setting for outputting the image data, storing the first preview image in a storage device, displaying, in response to a first preview request, the first preview image on a display unit; changing, in response to a changing request, the output setting, determining, in response to a second preview request after displaying the first preview image, whether the output setting is changed, determining, when it is determined the output setting is changed, whether the first preview image is to be regenerated, and generating, when it is determined the first preview image is to be regenerated, a second preview image based on the changed output setting. The second preview image can be displayed on the display unit when it is determined the first preview image is to be regenerated, and the first preview image can be stored in the storage device when it is determined the first preview image is not to be regenerated.

In the image output apparatus, when the image output apparatus determines the first preview image is not to be regenerated, the image output apparatus can send the first preview image stored in the storage device.

An image output apparatus can include a preview image generating unit configured to generate a first preview image of image data to be output based on an output setting for outputting the image data. A preview image storing unit can be configured to store the first preview image in a storage device. A changing unit can be configured to change the output setting based on a changing request. A control unit can be configured to: send, in response to a first preview request from the operation device, the first preview image to an operation device, receive, after sending the first preview image to the operation device, a changing request to change the output setting to a changed output setting, determine, in response to a second preview request from the operation device that is received after sending the first preview image, whether the first preview image is to be regenerated based on the changed output setting, and send the first preview image stored in the storage device to the operation device when the control unit determines the first preview image is not to be regenerated.

The control unit can be further configured to control the preview image generating unit to generate a second preview image based on the changed output setting when the control unit determines the first preview image is to be regenerated, and send the second preview image to the operation device.

The control unit can be further configured to determine whether the output setting is changed by the changing unit, and determine the first preview image is not to be regenerated, when the control unit determines the output setting is not changed.

The control unit can be further configured to send the first preview image stored in the storage device to the operation device when the control unit determines the output setting is not changed.

The control unit can be further configured to extract a difference between the output setting and the changed output setting, where the output setting is changed to the changed output setting when the control unit receives the changing request to change the output setting to the changed output setting, and determine, based on the extracted difference, whether the first preview image is to be regenerated.

The apparatus can include a regeneration setting storing unit that can be configured to store output setting information used by the control unit in determining whether the first preview image is to be regenerated. The control unit can be further configured to determine whether the extracted difference is included in the output setting information stored in the regeneration setting storing unit, and determine the first preview image is to be regenerated when the control unit determines the extracted difference is included in the output setting information stored in the regeneration setting storing unit.

The changing unit can be further configured to store, when the output setting is changed by the changing request, the output setting, which is in a state before the changing request is effected, and the changed output setting, which is in a state after the changing request is effected, in the storage device. The control unit can be further configured to extract the difference between the output setting and the changed output setting from the output setting the changed output setting stored in the storage device.

The control unit can be further configured to extract an image property of the first preview image, determine whether the extracted difference affects the extracted image property, and determine the first preview image is to be regenerated when the control unit determines the difference affects the extracted image property. The image property can be a color mode indicating whether the first preview image is color or the first preview image is white-and-black.

The image output apparatus can further include an operation panel as the operation device. The operation panel can be configured to receive a user operation by a user and configured to display the first preview image and the second preview image, wherein the control unit can send the first preview image or the second preview image to the operation panel for displaying the first preview image or the second preview image on the operation panel.

The image output apparatus can further include a network interface configured to connect to an external apparatus, where the external apparatus is the operation device. The external apparatus can be configured to display the first preview image and the second preview image. The control unit can be configured to send the first preview image and the second preview image to the external apparatus, via the network interface, for displaying the first preview image or the second preview image on the external apparatus.

The image output apparatus can be a printing apparatus that is configured to print the image data to be output on a printing medium.

A non-transitory computer readable medium having stored thereon a program that when executed by an image output apparatus can cause the image output apparatus to implement a preview image generating method.

A preview image generating method can be implemented on an image output apparatus.

A preview image generating method can include generating a first preview image of image data to be output based on an output setting for outputting the image data. The first preview image can be stored in a storage device. In response to a first preview request from an operation device, the first preview image can be sent to the operation device for displaying the first preview image on the operation device. After the sending the first preview image to the operation device, a changing request to change the output setting to a changed output setting can be received. In response to the changing request, the output setting can be changed.

In response to a second preview request that is received after sending the first preview image, it can be determined whether the output setting is changed. It can also be determined, when it is determined the output setting is changed, whether the first preview image is to be regenerated. When it is determined the first preview image is to be regenerated, a second preview image based on the changed output setting can be generated. The second preview image can be sent to the operation device when it is determined the first preview image is to be regenerated. The first preview image stored in the storage device can be sent to the operation device when it is determined the first preview image is not to be regenerated.

The operation device can be an operation panel of the image output apparatus. The operation device can also be an external apparatus that is connected to the image output apparatus.

The foregoing paragraphs have been provided by way of general introduction, and are not intended to limit the scope of the following claims. The described exemplary implementations, together with further advantages, will be best understood by reference to the following detailed description taken in conjunction with the accompanying drawings, wherein like reference numerals designate identical or corresponding parts throughout the several views.

BRIEF DESCRIPTION OF THE DRAWINGS

FIG. 5 is a sequence diagram illustrating another procedure for a process of displaying a preview image to the second embodiment.

DETAILED DESCRIPTION

Hereinafter, exemplary implementations will be described with reference to the accompanying drawings. However, variations and modifications may be made without departing from the basic concepts described herein.

In a preview image generation system, an image output apparatus can generate, before outputting image data, a preview image of the image data.

In a conventional image forming apparatus, when the print setting is changed by the user, the image forming apparatus regenerates the preview image based on the changed print setting regardless of a content of the changed print setting.

Thus, the image forming apparatus takes some time to display the preview image on the display device because of a processing time in regenerating the preview image.

However, all contents of the print setting do not necessarily affect the generating of the preview image. In other words, when the image forming apparatus regenerates the preview image based on the changed print setting, the regenerated preview image might be the same as the preview image previously generated.

Figure 1:
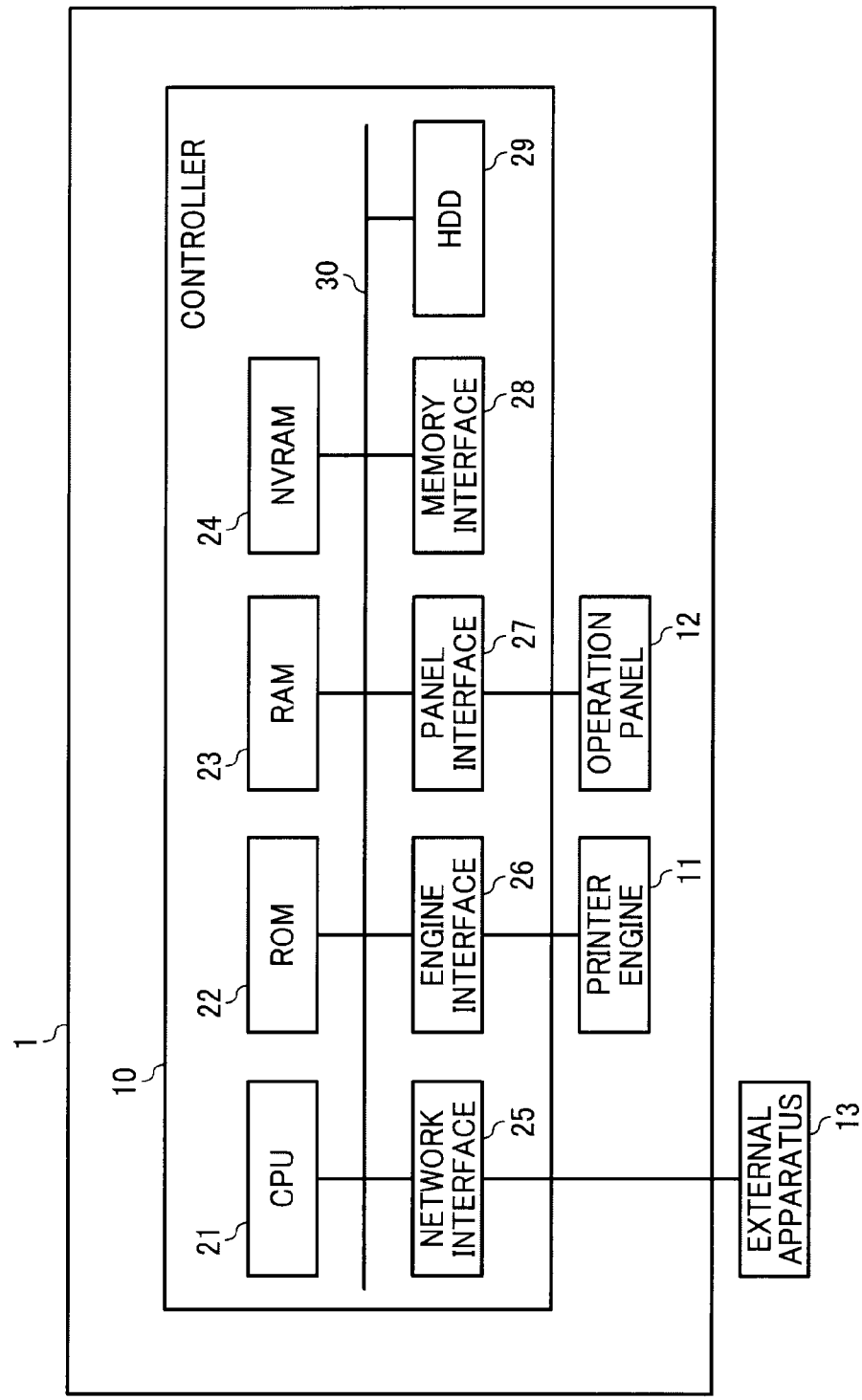
FIG. 1 is a block diagram of a hardware configuration of a printing apparatus.

In this case, even though the regenerated preview image and the preview image that was previously generated are the same, the image forming apparatus takes some time for regenerating the preview image. In an image output apparatus according to aspects of this disclosure, the image output apparatus is able to reduce the time required to send the preview image by using a stored preview image, instead of regenerating the preview image when a changed setting is determined to not result in a change in a preview image. FIG. 1 is a block diagram of an exemplary hardware configuration of the printing apparatus 1.

As illustrated in FIG. 1, the printing apparatus 1 includes a controller 10, a printer engine 11, and an operation panel 12.

The printer engine 11 forms output images on sheets. There are a plurality of methods of forming output images, such as an electrophotographic process and an ink jet process.

The operation panel 12 includes a display unit and an input unit. The operation panel 12 provides various information, such as machine status information and machine operation information, to a user, and receives various user operations, such as a performance setting and a print setting. Furthermore, the operation panel 12 displays a preview image in response to a request by the user.

The controller 10 includes a central processing unit (CPU) 21, a read only memory (ROM) 22, a random access memory (RAM) 23, a non volatile random access memory (NVRAM) 24, a network interface 25, an engine interface 26, a panel interface 27, a memory interface 28, a hard disk drive (HDD) 29, which are mutually connected to each other by a bus 30.

The ROM 22 is a nonvolatile semiconductor memory which can store data when the power is off. The ROM 22 includes a program for controlling the printing apparatus.

The RAM 23 is a volatile semiconductor memory which stores programs and data temporarily.

The CPU 21 reads out programs from ROM 22 and executes the read programs by using the RAM 23 as work memory. The CPU 21 manages the apparatus and realizes a function of the apparatus through executing software or instructions.

The NVRAM 24 is a nonvolatile semiconductor memory which can store data when the power is off. The NVRAM 24 stores data that is needed to keep storing when the power is off. The data includes a system setting value and a count value of print. Further, the NVRAM 24 stores a preview image.

The network interface 25 is an interface which connects an external apparatus 13, such as a personal computer (PC) and a mobile device, via a network.

The engine interface 26 is connected to the print engine 11, sends a control signal and a drawing data to the print engine 11. Furthermore, the engine interface 26 receives a status signal of the print engine from the print engine 11.

The panel interface 27 is connected to the operation panel 12, and sends a display signal to the operation panel 12.

The memory interface 28 is connected to a detachable storage medium, and sends/receives a data signal. The detachable storage medium may be one or more of a floppy disc, a compact disc (CD), a digital versatile disc (DVD), a SD memory card and an universal serial bus memory (USB).

The HDD 29 is a nonvolatile storage apparatus which stores a print job received from the external apparatus 31 or the detachable storage memory.

The printing apparatus is able to read a program for controlling the printing apparatus from the detachable storage medium and execute the read program from the detachable storage medium. A program for controlling the printing apparatus is a computer program written in a programming language (for example Java (Trade Mark), C, C++, C#). Further, the computer program stored in the detachable storage medium is able to be distributed.

A configuration of a preview displaying function will be described below.

Figure 2:
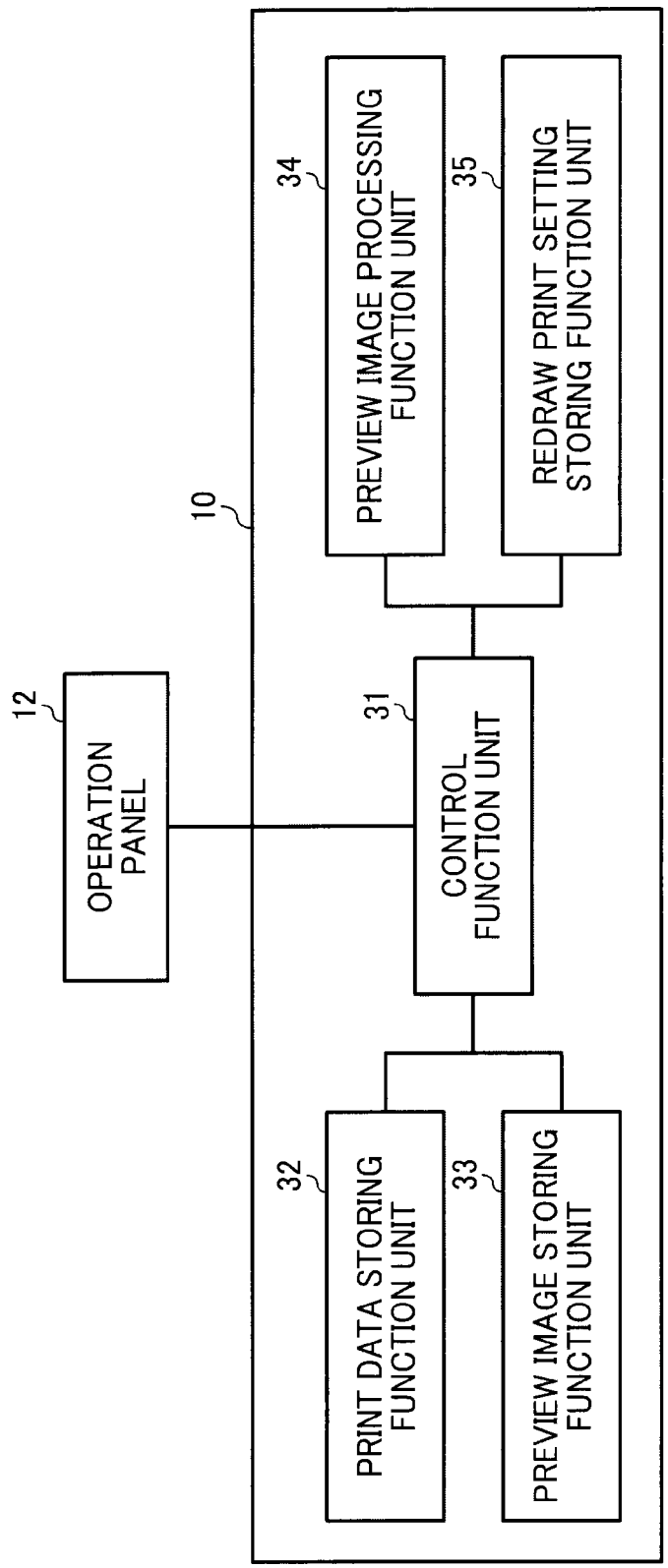
FIG. 2 is a diagram illustrating a functional configuration of the printing apparatus.

FIG. 2 is a diagram illustrating a functional configuration of displaying a preview image.

As illustrated in FIG. 2, a preview displaying function includes a control function unit 31, a print data storing function unit 32, a preview image storing function unit 33, a preview image processing function unit 34, and a redraw print setting storing function unit 35. A job list providing unit and a job providing unit can also be provided.

The control function unit 31 displays various information on the operation panel 12 by sending the various information to the operation panel 12. Further, the control function unit 31 detects various user operations and control the other function unit to execute a process in response to the detected user operation. Furthermore, when the control unit 31 detects a user operation for displaying a preview image, the control unit 31 displays, in response to the user operation, the preview image on the operation panel 12. In addition, when the control unit 31 detects the user operation for displaying the preview image after displaying the preview image on the operation panel 12, the control unit 31 determines whether the preview image should be regenerated. Further, when the control unit 31 determines the preview image should be regenerated, the control unit 31 controls the preview image processing function unit 34 to regenerate the preview image and displays the regenerated preview image on the operation panel 12. Meanwhile, when the control unit 31 determines the preview image should not be regenerated, the control unit 31 displays the preview image without regenerating.

The print data storing function unit 32 stores a print data and a print setting for the print data received from the external apparatus 13 or the detachable storage medium in the HDD 29. Further, the print data storing function unit 32 changes the print setting stored in the HDD 29, in response to a changing request from the control function unit 31.

The preview image processing unit 34 generates a preview image of the print data stored in the HDD 29 based on the print setting for the print data, in response to a request from the control function unit 31. For example, the preview image processing unit 34 converts the print data to a JPEG (Joint Photographic Experts Group) image and generates the preview image from the JPEG image.

The preview image storing function unit 33 stores the preview image generated by the preview image processing unit 34 in the NVRAM 24. Further, in response to a request from the control function unit 31, the preview image storing function unit 33 obtains the preview image from the NVRAM 24 and provides the obtained preview image to the control function unit 31.

The redraw print setting storing function unit 35 stores, in the NVRAM 24, print settings that indicate the preview image should be regenerated. Print settings include information for saving of toner, a resolution of an image, a color mode, and a changing of size. Further, in response to a request from the control function unit 31, the redraw print setting storing function unit 35 obtains the print settings from the NVRAM 24 and provides the obtained print settings to the control function unit 31.

In accordance with the above, a preview displaying function can be realized with a cooperation of performance by the function units. Further, the function units described above can be realized by the CPU. The CPU can read out programs (software which realizes the preview displaying function) installed in the printing apparatus to the memory (RAM) and executes a process, such as that described below.

A detailed process of a preview displaying function (with the cooperation of performance by each of the function units) will be described below with reference to a sequence diagram and a flowchart.

Figure 3:
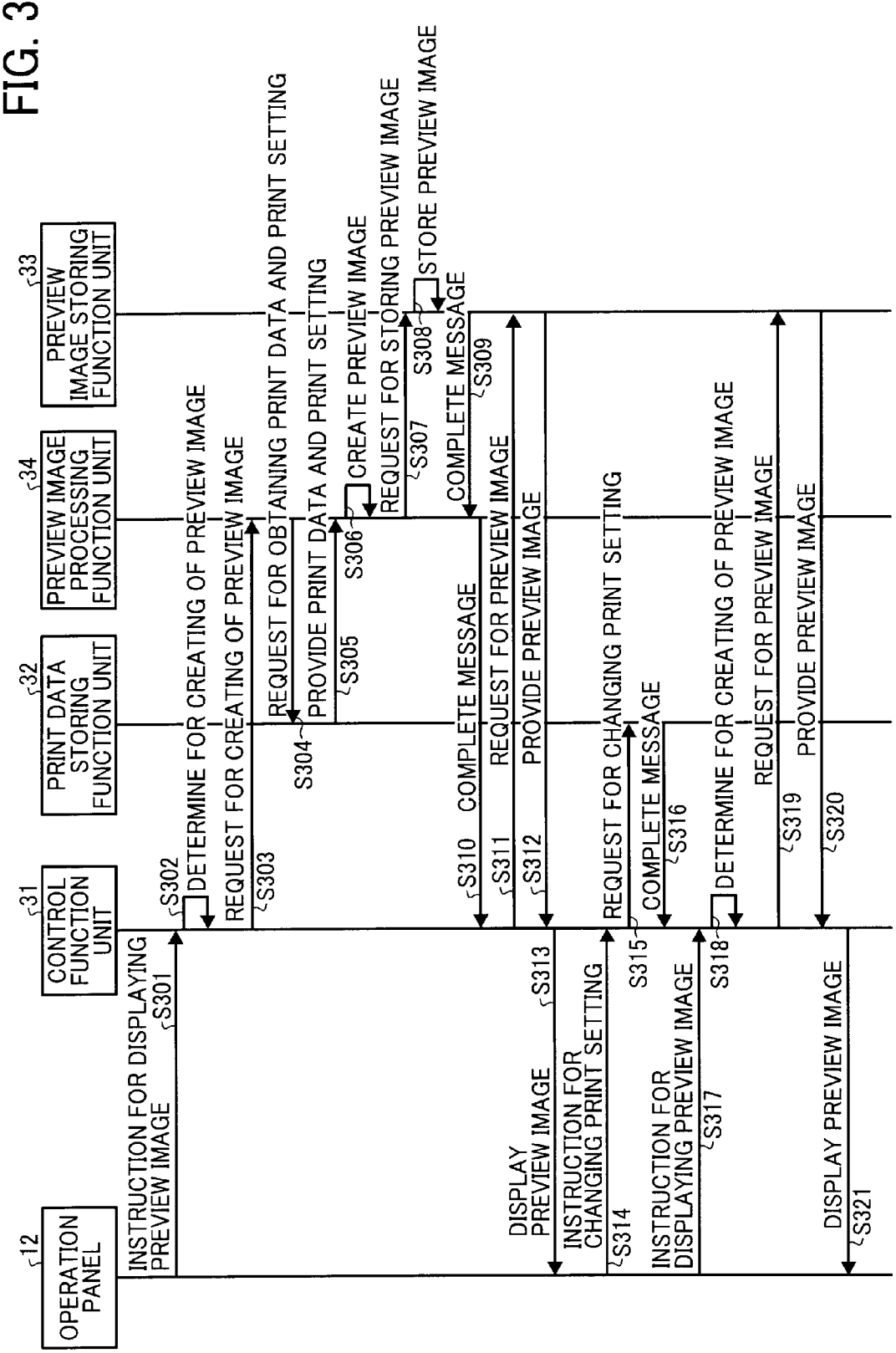
FIG. 3 is a sequence diagram illustrating a procedure for a process of displaying a preview image.

FIG. 3 is a sequence diagram illustrating a procedure for a process of preview displaying.

As illustrated in FIG. 3, the operation panel 12 sends an instruction for displaying the preview image of the print data stored in the HDD 29 to the control function unit 31, in response to an operation on the operation panel 12 by a user (step S301).

Next, in response to the instruction sent from the operation panel 12, the control function unit 31 determines whether the preview image of the printing data should be generated (step S302). In this case, the control function unit 31 determines the preview image of the printing data should be generated, because the instruction is a first instruction for displaying the preview image.

Next, the control function unit 31 sends a request for generating the preview image to the preview image processing function unit 34 (step S303).

Next, the preview image processing function unit 34 sends, based on the request for generating the preview image sent from the control function unit 31, a request for obtaining the print data stored in the HDD 29 to the print data storing function unit 32 (step S304).

Next, in response to the request for obtaining the print data sent from the preview image processing function unit 34, the print data storing function unit 32 obtains the print data and the print setting for printing the print data from the HDD 29. Furthermore, the print data storing function unit 32 provides the print data and the print setting obtained from the HDD 29 to the preview image processing function unit 34 (step S305).

Next, the preview image processing function unit 34 generates, based on the print setting provided by the print data storing function unit 32, the preview image of the print data provided by the print data storing function unit 32 (step S306). Further, the preview image processing function unit 34 sends the generated preview image and a request for storing the generated preview image to the preview image storing function unit 33 (step S307).

Next, in response to the request for storing the generated preview image sent from the preview image processing function unit 34, the preview image storing function unit 33 stores the preview image sent from the preview image processing function unit 34 in the NVRAM 24 (step S308).

Further, when the storing process is completed, the preview image storing function unit 33 sends, to the preview image processing function unit 34, a message that the storing of the preview image has been completed (step S309).

Next, in response to the message sent from the preview image storing function unit 33, the preview image processing function unit 34 sends a message that the generation of the preview image has been completed to the control function unit 31 (step S310).

Next, in response to the message sent from the preview image processing function unit 34, the control function unit 31 sends a request for obtaining the preview image generated by the preview image processing function unit 34 to the preview image storing function unit 33 (step S311).

Next, in response to the request sent from the control function unit 31, the preview image storing function unit 33 obtains the preview image from the NVRAM 24 and provides the obtained preview image to the control function unit 33 (step S312).

Next, the control function unit 31 displays the preview image provided by the preview image storing function unit 33 on the operation panel 12 (step S313).

The above processes describe a process for displaying the preview image. A changing process of changing the print setting and a preview displaying process will be described below.

As illustrated in FIG. 3, the operation panel 12 sends an instruction for changing the print setting to the control function unit 31, when the operation panel receives an user operation for changing the print setting (step S314).

Next, in response to the instruction for changing the print setting sent from the operation panel 12, the control function unit 31 sends a request for changing the print setting to the print data storing function unit 32 (step S315).

Next, the print data storing function unit 32 changes the print setting stored in the HDD 22 based on the request sent from the control function unit 31. In addition, the print data storing function unit 32 stores both: (1) the print setting before changing and (2) the print setting after changing in the HDD. Furthermore, the print data storing function unit 32 sends a message that the changing of the print setting has been completed to the control function unit 31 (step S316).

Next, the operation panel 12 sends an instruction for displaying the preview image of the print data stored in the HDD 29 to the control function unit 31, in response to an operation by a user (step S317).

Next, in response to the instruction sent from the operation panel 12, the control function unit 31 determines whether the preview image of the printing data should be regenerated (step S318).

A detailed process of the determination whether the preview image of the printing data should be regenerated will be described below with reference to a flowchart.

Figure 4:
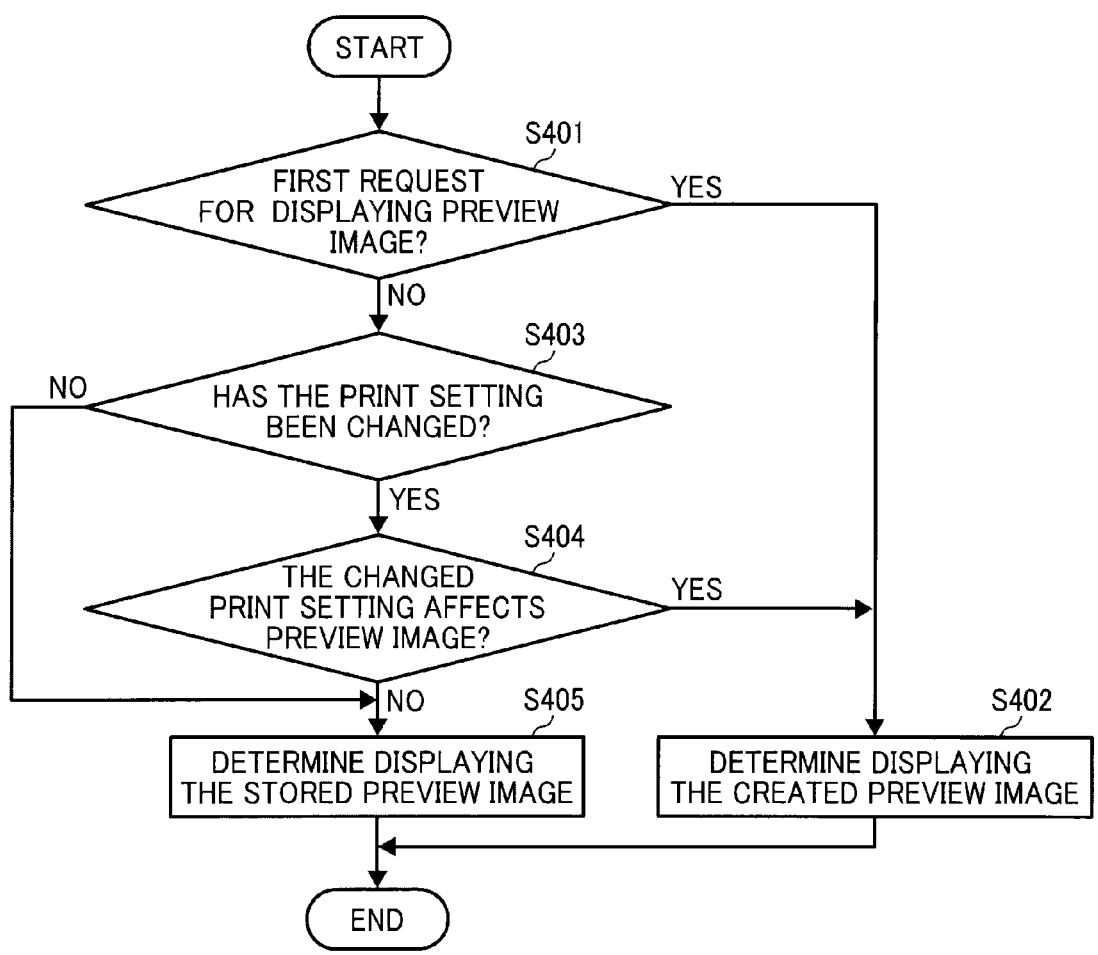
FIG. 4 is a flowchart illustrating a procedure for determining whether a preview image is to be regenerated.

FIG. 4 is a flowchart illustrating a procedure for the determination whether the preview image of the printing data should be regenerated.

As illustrated in FIG. 4, the control function unit 31 determines whether the received instruction for displaying the preview image is the first instruction (step S401). When the control function unit 31 determines the received instruction for displaying the preview image is the first instruction (step S401: YES), the control function unit 31 determines the preview image should be generated and determines the generated preview image is the preview image for displaying (step S402).

Next, when the control function unit 31 determines the received instruction for displaying the preview image is not the first image (step S401: NO), the control function unit 31 determines whether the print setting is changed after displaying the preview image (step S403).

Next, when the control function unit 31 determines the print setting is changed after displaying the preview image (step S403: YES), the control function unit 31 determines whether the changed print setting affects the preview image (step S404).

A detailed process of the determination whether the changed print setting affects the preview image will be described below.

First, the control function unit 31 obtains the print setting before changing and the print setting after changing from the print data storing function unit 32. Further, the control function unit 32 obtains the print settings stored in the NVRAM 24 from the redraw print setting storing function unit 35.

Furthermore, the control function unit 31 determines whether the difference between the print setting before changing and the print setting after changing includes at least one print setting among the obtained print settings. Further, when the control function unit 31 determines the difference includes at least one print setting among the obtained print settings, the control function unit 31 determines the changed print setting affects the preview image.

On the other determination process, the control function unit 31 determines, based on the difference and an image attribute of the print data, whether the changed print setting affects the preview image.

For example, when the print data is monochrome image and the difference is a setting of color mode, the control function unit 31 can determine the changed print setting does not affect the preview image. Because, the preview image based on the setting before changing and the preview image based on the setting after changing are the same even though changing the print setting.

Next, the control function unit 31 determines the changed print setting affects the preview image (step S404: YES), the control function unit 31 determines the preview image should be generated and determines the generated preview image is the preview image for displaying (step S402). In this case, the determination for generating the preview image is the same as the determination for regenerating the preview image.

Next, when the control function unit 31 determines the print setting is not changed after displaying the preview image (step S403: NO), the control function unit 31 determines the preview image should not be regenerated and determines the preview image stored in the HDD 22 is the preview image for displaying (step S405).

Next, when the control function unit 31 determines the changed print setting does not affect the preview image (step S404: NO), the control function unit 31 determines the preview image should not be regenerated and determines the preview image stored in the HDD 22 is the preview image for displaying (step S405).

The above processes describe a determination process of regenerating the preview image. The preview displaying process will be described below with reference to FIG. 3.

As illustrated in FIG. 3, the control function unit 31 determines the preview image of the printing data should not be regenerated (step S318).

Next, the control function unit 31 sends a request for the preview image stored in the NVRAM 24 to the preview image storing function unit 33 (step S319).

Next, in response to the request sent from the control function unit 31, the preview image storing function unit 33 obtains the preview image from the NVRAM 24 and provides the obtained preview image to the control function unit (step S320).

Next, the control function unit 31 displays the preview image provided by the preview image storing function unit on the operation panel 12 (step S321).

As described above, when the printing apparatus 1 displays the preview image and the print setting is changed, the printing apparatus 1 determines whether the preview image should be regenerated based on the changed print setting. Further, when the printing apparatus 1 determines the preview image should not be regenerated, the printing apparatus 1 displays the preview image stored in the NVRAM 24.

Thus, in the printing apparatus 1, when the printing apparatus 1 displays the preview image, the printing apparatus 1 is able to reduce the time to display the preview image by using the stored preview image. Descriptions of configurations below having reference numerals that are the same as those in the above description are omitted unless there is a special necessity.

The printing apparatus 1 can generate a preview image and send the generated preview image to the external apparatus 13, in response to a request for the preview image from the external apparatus 13.

FIG. 5 is a sequence diagram illustrating a procedure for a sending process of preview image to the external apparatus 13.

As illustrated in FIG. 5, the external apparatus sends a request for a preview image of the print data stored in the HDD 29 to the control function unit 31, in response to an operation on the external apparatus 13 by a user (step S501).

Next, in response to the received request from the external apparatus 13, the control function unit 31 determines whether the preview image of the printing data should be generated (step S502). In this case, the control function unit 31 determines the preview image should be generated, because the request is a first request for the preview image.

Next, the control function unit 31 sends a request for generating the preview image to the preview image processing function unit 34 (step S503).

Next, the preview image processing function unit 34 sends, based on the request for generating the preview image sent from the control function unit 31, a request for obtaining the print data stored in the HDD 29 to the print data storing function unit 32 (step S504).

Next, in response to the request for obtaining the print data sent from the preview image processing function unit 34, the print data storing function unit 32 obtains the print data and the print setting for printing the print data from the HDD 29. Furthermore, the print data storing function unit 32 provides the print data and the print setting obtained from the HDD 29 to the preview image processing function unit 34 (step S505).

Next, the preview image processing function unit 34 generates, based on the print setting provided by the print data storing function unit 32, the preview image of the print data provided by the print data storing function unit 32 (step S506). Further, the preview image processing function unit 34 sends the generated preview image and a request for storing the generated preview image to the preview image storing function unit 33 (step S507).

Next, in response to the request for storing the generated preview image sent from the preview image processing function unit 34, the preview image storing function unit 33 stores the preview image sent from the preview image processing function unit 34 in the NVRAM 24 (step S508).

Further, when the storing process is completed, the preview image storing function unit 33 sends, to the preview image processing function unit 34, a message that the storing of the preview image has been completed (step S509).

Next, in response to the message sent from the preview image storing function unit 33, the preview image processing function unit 34 sends a message that the generation of the preview image has been completed to the control function unit 31 (step S510).

Next, in response to the message sent from the preview image processing function unit 34, the control function unit 31 sends a request for obtaining the preview image generated by the preview image processing function unit 34 to the preview image storing function unit 33 (step S511).

Next, in response to the request sent from the control function unit 31, the preview image storing function unit 33 obtains the preview image from the NVRAM 24 and provides the obtained preview image to the control function unit 33 (step S512).

Next, the control function unit 31 sends the preview image provided by the preview image storing function unit 33 to the external apparatus 13 (step S513).

The above processes describe a process for sending the preview image to the external apparatus 13. The changing process of the print setting and the preview sending process will be described below.

As illustrated in FIG. 3, the external apparatus 13 sends a request for changing the print setting to the control function unit 31, when the external apparatus 13 receives an user operation for changing the print setting by the user (step S514).

Next, in response to the request for changing the print setting sent from the external apparatus 13, the control function unit 31 sends a request for changing the print setting to the print data storing function unit 32 (step S515).

Next, the print data storing function unit 32 changes the print setting stored in the HDD 22 based on the request sent from the control function unit 31. In addition, the print data storing function unit 32 stores, in the HDD, both: (1) the print setting before changing and (2) the print setting after changing. Furthermore, the print data storing function unit 32 sends a message that the changing of the print setting has been completed to the control function unit 31 (step S516).

Next, the external apparatus 13 sends a request for the preview image of the print data stored in the HDD 29 to the control function unit 31, in response to an operation on the external apparatus 13 by the user (step S517).

Next, in response to the request sent from the external apparatus 13, the control function unit 31 determines whether the preview image of the printing data should be regenerated (step S518).

A detailed process of the determination whether the preview image of the printing data should be regenerated is the same as the process of s318 described previously.

As illustrated in FIG. 5, the control function unit 31 sends a request for the preview image stored in the NVRAM 24 to the preview image storing function unit 33 (step S519).

Next, in response to the request sent from the control function unit 31, the preview image storing function unit 33 obtains the preview image from the NVRAM 24 and provides the obtained preview image to the control function unit (step S20).

Next, the control function unit 31 sends the preview image provided by the preview image storing function unit to the external apparatus (step S521).

As described above, when the printing apparatus 1 sends the preview image and the print setting is changed, the printing apparatus 1 determines whether the preview image should be regenerated based on the changed print setting. Further, when the printing apparatus 1 determines the preview image should not be regenerated, the printing apparatus 1 sends the preview image stored in the NVRAM 24 to the external apparatus 13.

Thus, in the printing apparatus 1, when the printing apparatus 1 sends the preview image to the external apparatus 13, the printing apparatus 1 is able to reduce the time to send the preview image by using the stored preview image.

The descriptions provided herein are only exemplary, and variations and modifications may be made without departing from the concepts discussed herein.

What is claimed is:

1. An image output apparatus, comprising:
    a preview image generating unit configured to generate a first preview image of image data to be output based on an output setting for outputting the image data;
    a preview image storing unit configured to store the first preview image in a storage device;
    a changing unit configured to change the output setting based on a changing request; and
    a control unit configured to:
    send, in response to a first preview request from an operation device, the first preview image to the operation device,
    receive, after sending the first preview image to the operation device, a changing request to change the output setting to a changed output setting,
    determine, in response to a second preview request from the operation device that is received after sending the first preview image, whether the first preview image is to be regenerated based on the changed output setting, and
    send the first preview image stored in the storage device to the operation device when the control unit determines the first preview image is not to be regenerated.

2. The image output apparatus as claimed in claim 1, wherein the control unit is further configured to:
    control the preview image generating unit to generate a second preview image based on the changed output setting when the control unit determines the first preview image is to be regenerated, and
    send the second preview image to the operation device.

3. The image output apparatus as claimed in claim 2, wherein the control unit is further configured to:
    determine whether the output setting is changed by the changing unit, and
    determine the first preview image is not to be regenerated, when the control unit determines the output setting is not changed.

4. The image output apparatus as claimed in claim 3, wherein the control unit is further configured to:
    send the first preview image stored in the storage device to the operation device when the control unit determines the output setting is not changed.

5. The image output apparatus as claimed in claim 3, wherein the control unit further configured to:
    extract a difference between the output setting and the changed output setting, where the output setting is changed to the changed output setting when the control unit receives the changing request to change the output setting to the changed output setting, and
    determine, based on the extracted difference, whether the first preview image is to be regenerated.

6. The image output apparatus as claimed in claim 5, further comprising:
    a regeneration setting storing unit configured to store output setting information used by the control unit in determining whether the first preview image is to be regenerated, wherein
    the control unit determines whether the extracted difference is included in the output setting information stored in the regeneration setting storing unit, and determines the first preview image is to be regenerated when the control unit determines the extracted difference is included in the output setting information stored in the regeneration setting storing unit.

7. The image output apparatus as claimed in claim 5, wherein:
    the changing unit is further configured to store, when the output setting is changed by the changing request, the output setting, which is in a state before the changing request is effected, and the changed output setting, which is in a state after the changing request is effected, in the storage device, and
    the control unit is further configured to extract the difference between the output setting and the changed output setting from the output setting the changed output setting stored in the storage device.

8. The image output apparatus as claimed in claim 5, wherein the control unit is further configured to:
    extract an image property of the first preview image,
    determine whether the extracted difference affects the extracted image property, and
    determine the first preview image is to be regenerated when the control unit determines the difference affects the extracted image property.

9. The image output apparatus as claimed in claim 8, wherein the image property is a color mode indicating whether the first preview image is color or the first preview image is white-and-black.

10. The image output apparatus as claimed in claim 2, further comprising:
    an operation panel, as the operation device, configured to receive a user operation by a user and configured to display the first preview image and the second preview image, wherein
    the control unit sends the first preview image or the second preview image to the operation panel for displaying the first preview image or the second preview image on the operation panel.

11. The image output apparatus as claimed in claim 2, further comprising:
    a network interface configured to connect to an external apparatus, wherein
    the external apparatus is the operation device,
    the external apparatus is configured to display the first preview image and the second preview image, and the control unit is configured to send the first preview image and the second preview image to the external apparatus, via the network interface, for displaying the first preview image or the second preview image on the external apparatus.

12. The image output apparatus as claimed in claim 1, wherein the image output apparatus is a printing apparatus that is configured to print the image data to be output on a printing medium.

13. A preview image generating method on an image output apparatus, comprising:
- generating a first preview image of image data to be output based on an output setting for outputting the image data;
- storing the first preview image in a storage device;
- sending, in response to a first preview request from an operation device, the first preview image to the operation device for displaying the first preview image on the operation device;
- receiving, after the sending the first preview image to the operation device, a changing request to change the output setting to a changed output setting;
- changing, in response to the changing request, the output setting;
- determining, in response to a second preview request that is received after sending the first preview image, whether the output setting is changed;
- determining, when it is determined the output setting is changed, whether the first preview image is to be regenerated;
- generating, when it is determined the first preview image is to be regenerated, a second preview image based on the changed output setting; and
- sending, to the operation device, the second preview image when it is determined the first preview image is to be regenerated, and sending the first preview image stored in the storage device when it is determined the first preview image is not to be regenerated.

14. The preview image generating method as claimed in claim 13, wherein the operation device is an operation panel of the image output apparatus.

15. The preview image generating method as claimed in claim 13, wherein the operation device is an external apparatus that is connected to the image output apparatus.

16. A non-transitory computer readable medium having stored thereon a program that when executed by an image output apparatus causes the image output apparatus to implement a method, the method comprising:
- generating a first preview image of image data to be output based on an output setting for outputting the image data;
- storing the first preview image in a storage device;
- sending, in response to a first preview request from an operation device, the first preview image to the operation device for displaying the first preview image on the operation device;
- receiving, after the sending the first preview image to the operation device, a changing request to change the output setting to a changed output setting;
- changing, in response to the changing request, the output setting;
- determining, in response to a second preview request that is received after sending the first preview image, whether the output setting is changed;
- determining, when it is determined the output setting is changed, whether the first preview image is to be regenerated;
- generating, when it is determined the first preview image is to be regenerated, a second preview image based on the changed output setting; and
- sending, to the operation device, the second preview image when it is determined the first preview image is to be regenerated, and sending the first preview image stored in the storage device when it is determined the first preview image is not to be regenerated.

* * * * *